Dec. 12, 1933.     C. M. DAVIDSON     1,939,109
QUICK FREEZING OF FOOD PRODUCTS
Filed May 22, 1930     4 Sheets-Sheet 2
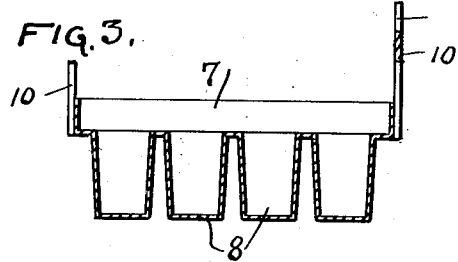
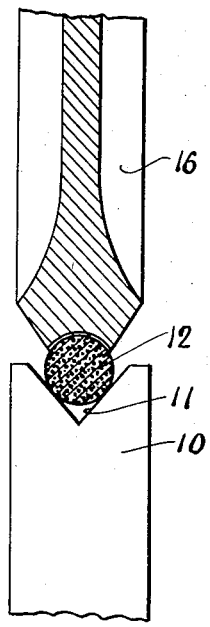
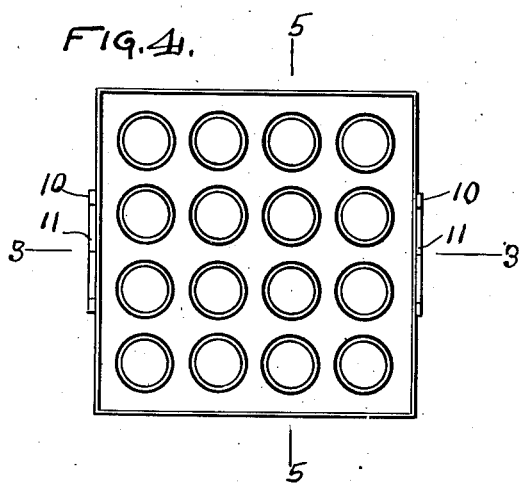
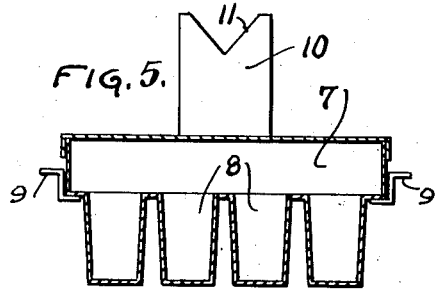
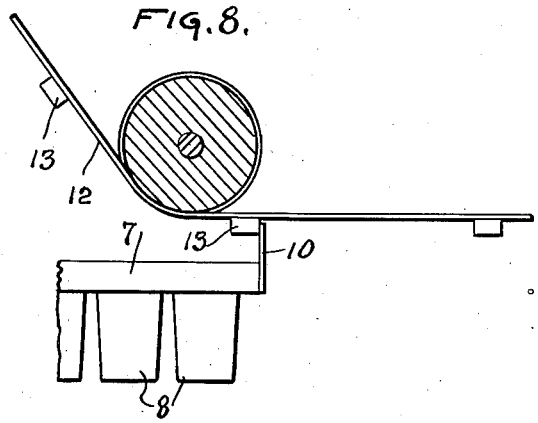
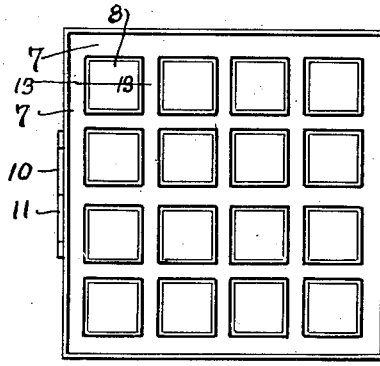
CLARENCE M. DAVIDSON, Inventor

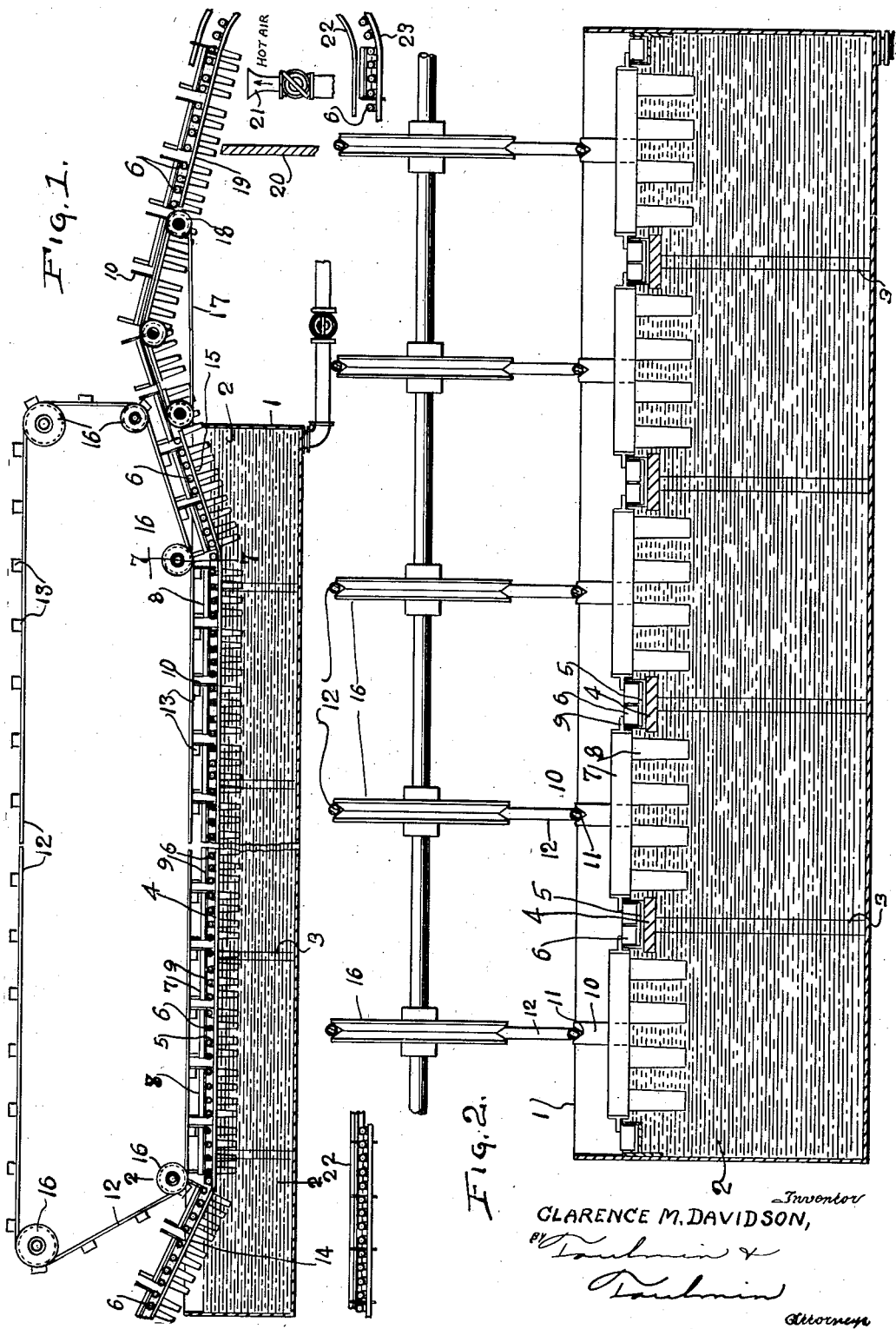

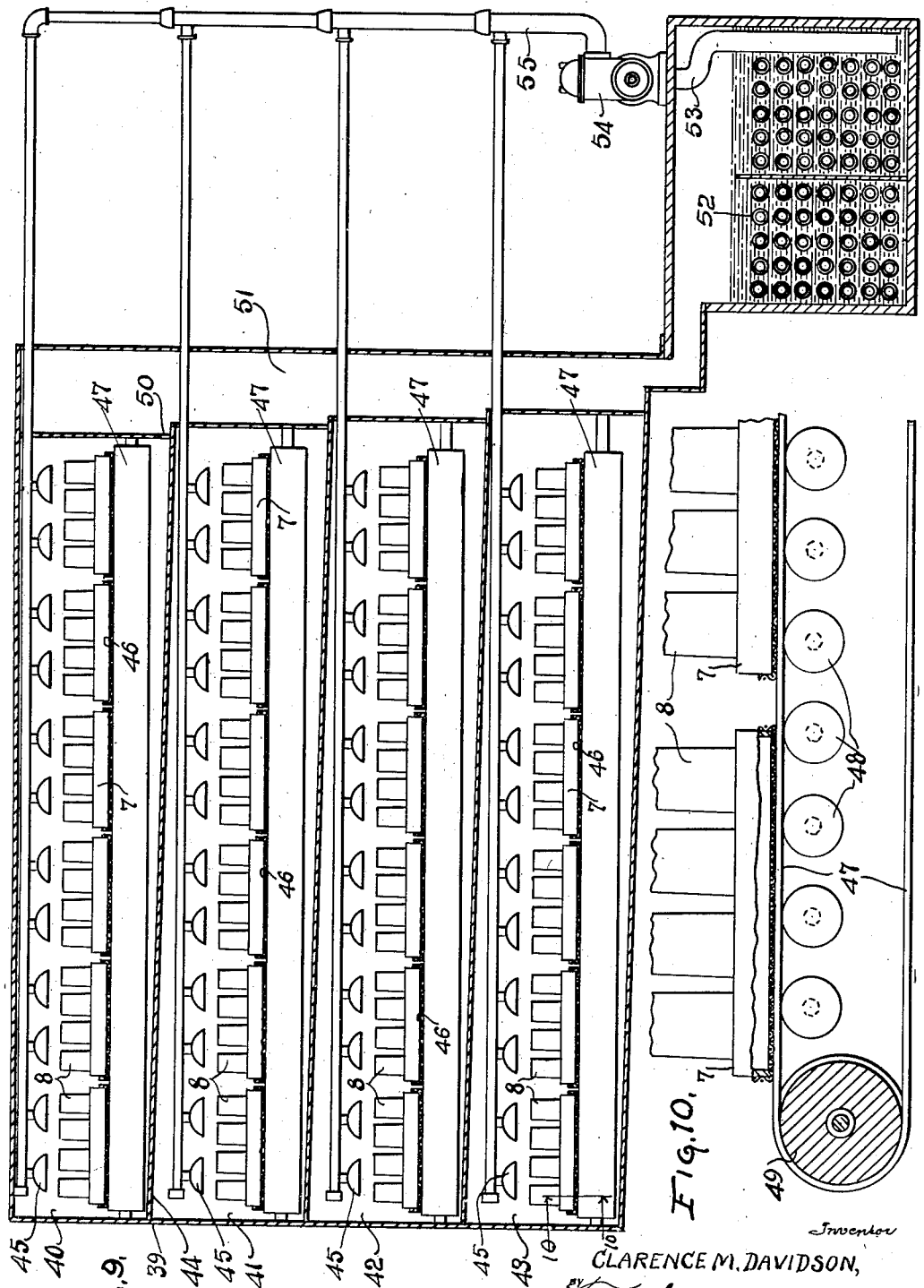

Dec. 12, 1933.　　　C. M. DAVIDSON　　　1,939,109
QUICK FREEZING OF FOOD PRODUCTS
Filed May 22, 1930　　　4 Sheets-Sheet 4
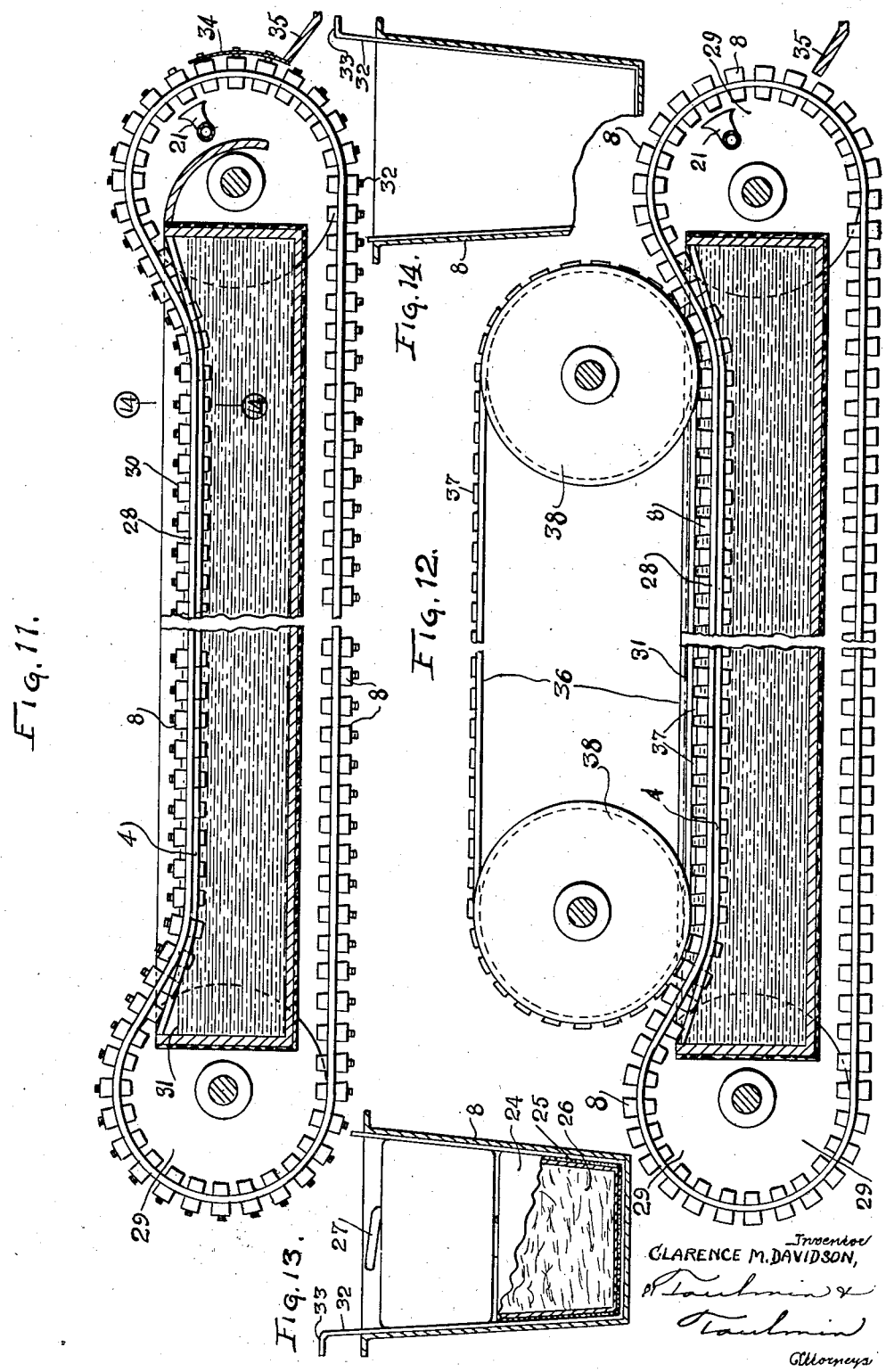
Inventor
CLARENCE M. DAVIDSON,
Attorneys Patented Dec. 12, 1933

1,939,109

UNITED STATES PATENT OFFICE 1,939,109

QUICK FREEZING OF FOOD PRODUCTS

Clarence M. Davidson, Miami, Fla., assignor to Pan American Frozen Products, Inc., Miami, Fla., a corporation of Delaware Application May 22, 1930. Serial No. 454,601

10 Claims. (Cl. 62—104)

My invention relates to the quick freezing of food products.

It is the object of my invention to provide means of conveying food products, particularly citrous fruits and juices, berries and deciduous fruits, through a path of refrigerant without direct contact with the refrigerant, at a predetermined rate of speed and on a predetermined path, in order to provide uniformity of control of the application of the quick freezing temperature.

It is a further object to provide means of carrying the product to be frozen out of contact with the refrigerant but beneath the surface thereof and to carry it within the packages in which it ultimately reaches the consumer.

It is an object to provide containers for passage through the refrigerant which will accommodate packages of substantially the same size, singly or in multiple.

It is a further object to provide a refrigerant which will also act as a lubricant for the guides and supports for those containers in which the products to be frozen are located during the freezing operation.

It is a further object to provide means, such as hot air, for suddenly decreasing the surface temperature of the permanent containers to detach the consumer containers therefrom after freezing but without affecting the temperature of the frozen product.

It is an object to provide means of conveying the permanent containers with the consumer containers therein beneath the level of the refrigerant and to apply covers to the permanent containers prior to, during and for a short period after submersion; it is a further object to provide means of melting any freezing of the permanent container and the consumer container and of mechanically removing the consumer containers from the permanent containers.

It is a further object to provide a spraying method of applying refrigerant in which the containers of a peremanent character are inverted and conveyed while they are in their inverted condition and to utilize a continuous system of refrigerant.

Referring to the drawings:

Figure 1 is a section through a refrigerant tank with a conveyor system and permanent containers shown in elevation;

Figure 2 is a section on the line 2—2 of Figure 1;

Figure 3 is a section through a typical container on the line 3—3 of Figure 4;

Figure 4 is a top plan view of the permanent container with circular receptacles;

Figure 5 is a similar view showing the container in section with the cover thereon, the section being taken on the line 5—5 of Figure 4;

Figure 6 is a top plan view of the permanent container with square receptacles;

Figure 7 is a section on the line 7—7 of Figure 1;

Figure 8 is a detail view of a modified form with the pulley in section showing the method of moving the permanent container along the guide and roller supports;

Figure 9 is a vertical section through a system employing a spray;

Figure 10 is a section on the line 10—10 of Figure 9;

Figure 11 is a side elevation with the tank in section of a non-submerged type of quick freezing apparatus;

Figure 12 is a view of the submerged type with cover applying mechanism;

Figure 13 is a section on the line 13—13 of Figure 6 showing the detachable consumer containers in position, which are preferably made of paper with a layer of paraffin on the outside;

Figure 14 is a section on the line 14—14 of Figure 11 of a container having an ejecting strap.

Referring to the drawings in detail, 1 is a tank having a refrigerant, such as glycerin or brine; glycerin is preferred because of its lubricant qualities. The refrigerant is designated by the numeral 2. It may be supplied or withdrawn or otherwise circulated as may be desired.

The tank contains a plurality of spaced standards 3 having horizontal rails 4 upon which are mounted roller troughs 5 carrying rollers 6. On these rollers travel permanent containers, made of such material as aluminum, comprising a body portion 7 and depending compartments 8. The body compartment is provided with angular side rails 9 which rest upon the rollers 6. Either end of these permanent containers is provided with vertically-disposed arms 10 having V-shaped notches 11 for engaging with the conveyor belts 12 which carry impeller blocks 13. The forward arm 10 is engaged by the block 13 and the rear arm engages with the belt 12 in emergency to prevent the upward movement of the rear end of the container.

These containers are introduced into the refrigerant bath on the diagonal portions 14 of the guiding members having the rollers 6 and are lifted from the bath on diagonal portions of the rails 15. The belt 12 is provided with any number of pulleys 16 for guiding it.

In order to facilitate the removal of the containers from the refrigerant, I provide a supplementary belt 17 on which the containers travel in place of rollers, this belt being carried on pulleys 18. Both belts 12 and 17 are driven through their pulleys by any suitable source of power, such as an electric motor. By the use of the belt 17 the permanent containers are started in a downward path on to the rail and rollers 6 designated 19 by means of which they pass over the partition 20 into the path of a hot air blast 21. They descend by gravity between the rails 22 and 23 and assume an inverted position whereupon the consumer containers, which have been warmed, will drop out of the permanent containers. These consumer containers are shown in Figure 13 and consist of a paste board body 24 having a paraffin coating 25 with the contents 26 sealed by the cover 27. One or more of these consumer containers, which are in closely adjacent contact with the walls of the permanent container 8, may be located therein.

I prefer the square form of container for both the permanent and consumer containers as it greatly facilitates packing and shipping and also increases the effective area for applying the lower temperature as I can employ narrow or thin packs.

In the form shown in Figure 11, the permanent containers 8 are carried on a continuously moving belt 28 mounted upon the pulleys 29 at the respective ends of the apparatus. The tops of the containers as at 30 are open and they are arranged to travel, by reason of the guide rails 4, with their tops just above the level 31 of the refrigerant. Each container is provided, as shown in Figure 14, with a U-shaped strap 32 upon which rests the consumer container 24. The purpose of this strap is to mechanically remove the containers 24 from the permanent container 8. This is effected by bringing the outwardly extending ends 33 of the straps 32 over a cam rail 34 on either side thereof, which lifts the containers 24 and the strap 32 out of the permanent container 8 dumping the contents upon the platform 35. A warm air blast 21 may be used to defrost any connection between the strap 32 and the permanent container 8.

Referring to Figure 12, where the permanent containers 8 are completely submerged below the level of the refrigerant 31, I have provided an endless belt 36 having spaced covers 37 adapted to be applied successively to the tops of the permanent containers 8 prior to their being submerged beneath the level of the refrigerant 31, the covers being kept in position by the belt 36 until the containers are lifted from the refrigerant. The actuating and supporting pulleys 38 support the belt 36 and the covers 37 and are preferably synchronously driven with the pulleys 29 by mechanism not shown, but of conventional character.

Referring to Figure 9 which shows the spray form of applying the refrigerant, I provide a chamber 39 having a plurality of compartments 40, 41, 42 and 43 separated by partitions 44 and having in each compartment a plurality of downwardly directed sprays 45 which spray the refrigerant upon the inverted permanent containers 8 and which are provided with frames of wire that rest within the box portions 7 of the containers having their edges resting upon the conveyor belt. This wire screen is designated 46, the belt 47, the supporting rollers for the belt 48 and the actuating pulleys 49.

All of the partitions 44 slope in the same direction for discharging the spray liquid through the ports 50 into a common exit passageway 51 where the refrigerant is returned over the cooling coils 52 and thence pumped through the pipe 53 by the pump 54 and pipe 55 back to the individual sprays 45 for re-use.

It is a part of my invention to provide a body of refrigerant, the temperature of which can be suitably controlled, which also can act as a lubricant, through which refrigerant the permanent containers are moved at a predetermined rate of speed so that uniformity of freezing can be insured, and it is further a part of my invention to provide means for effecting attachment, both by gravity, mechanically and by an air blast, which quickly separates the permanent container from the consumer container. It is further a part of my method of utilizing closely fitting consumer containers within the permanent containers so that there is no re-handling of the product when frozen from the time it is originally inserted and sealed until the time the consumer opens it.

It will be understood that I desire to comprehend within my invention such modifications as may be necessary to adapt it to varying conditions and uses.

Having thus fully described my invention, what I claim as new and desire to secure by Letters Patent, is:—

1. In combination, a reservoir, glycerin therein utilized as a refrigerant and a lubricant, permanent containers engaging said lubricant and refrigerant, and means in the reservoir for supporting the containers as they are moved adapted to be lubricated by the glycerin while the contents of the containers are refrigerated by the glycerin.

2. In combination, a reservoir, glycerin therein utilized as a refrigerant and a lubricant, permanent containers engaging said lubricant and refrigerant, and means in the reservoir for supporting the containers as they are moved adapted to be lubricated by the glycerin while the contents of the containers are refrigerated by the glycerin, said supporting means comprising spaced supports, roller supports and rollers therein.

3. In combination, a reservoir, glycerin therein utilized as a refrigerant and a lubricant, permanent containers engaging said lubricant and refrigerant, and means in the reservoir for supporting the containers as they are moved adapted to be lubricated by the glycerin while the contents of the containers are refrigerated by the glycerin, said supporting means comprising spaced supports, roller supports and rollers therein, and side rails engaging said rollers mounted on each of said containers.

4. In combination, a reservoir, glycerin therein utilized as a refrigerant and a lubricant, permanent containers engaging said lubricant and refrigerant, and means in the reservoir for supporting the containers as they are moved adapted to be lubricated by the glycerin while the contents of the containers are refrigerated by the glycerin, said supporting means comprising spaced supports, roller supports and rollers therein, side rails engaging said rollers mounted on each of said containers, and means for actuating said containers.

5. In combination, a reservoir, glycerin therein utilized as a refrigerant and a lubricant, permanent containers engaging said lubricant and refrigerant, and means in the reservoir for supporting the containers as they are moved adapted to be lubricated by the glycerin while the contents of the containers are refrigerated by the glycerin, said supporting means comprising spaced supports, roller supports and rollers therein, side rails engaging said rollers mounted on each of said containers, and means for actuating said containers remote from said refrigerant.

6. In combination, a reservoir, glycerin therein utilized as a refrigerant and a lubricant, permanent containers engaging said lubricant and refrigerant, and means in the reservoir for supporting the containers as they are moved adapted to be lubricated by the glycerin while the contents of the containers are refrigerated by the glycerin, said supporting means comprising spaced supports, roller supports and rollers therein, side rails engaging said rollers mounted on each of said containers, and means for actuating said containers remote from said refrigerant, and means for preventing said containers from tilting.

7. In combination, a reservoir, a plurality of permanent containers, a supply of refrigerant in said reservoir surrounding said containers, means to move said containers therethrough, and means of applying a hot air blast to said permanent containers upon the removal from the refrigerant in order to suddenly increase the temperature thereof.

8. In combination, a reservoir, a plurality of permanent containers, a supply of refrigerant in said reservoir surrounding said containers, means to move said containers therethrough, and means of applying a hot air blast to said permanent containers upon the removal from the refrigerant in order to suddenly increase the temperature thereof, and temporary containers in said permanent containers containing products to be frozen therein adapted to be released from the permanent containers by said hot air blast.

9. In combination, a reservoir, a plurality of permanent containers, a supply of refrigerant in said reservoir surrounding said containers, means to move said containers therethrough, and means of applying a hot air blast to said permanent containers upon the removal from the refrigerant in order to suddenly increase the temperature thereof, and temporary containers in said permanent containers containing products to be frozen therein adapted to be released from the permanent containers by said hot air blast, and means to permit the ejection of the consumer containers by gravity.

10. In combination, a unitary permanent container adapted to be inserted directly in liquid refrigerant having a plurality of spaced depending pockets and consumer containers containing articles to be refrigerated adapted to be removably located within said pockets, and means for completely covering said pockets, and means for submerging both containers beneath the level of the refrigerant.

CLARENCE M. DAVIDSON.